United States Patent
Bequet et al.

[15] 3,661,694
[45] May 9, 1972

[54] BIDIRECTIONALLY ORIENTED CORRUGATED PLATES

[72] Inventors: Jean Francois Bequet, Brussels; Roger Van Asbroeck, Neerijse; Paul Du Bois, Braine-lAlleund, all of Belgium

[73] Assignee: Solvay & Cie, Brussels, Belgium

[22] Filed: Dec. 30, 1970

[21] Appl. No.: 102,607

[30] Foreign Application Priority Data

Dec. 31, 1969 Belgium..................................83421

[52] U.S. Cl..............................161/133, 264/286, 161/402, 264/291
[51] Int. Cl. .........................................B32b 3/28, B32b 3/30
[58] Field of Search..................161/133, 402; 264/286, 289, 264/291, 292

[56] References Cited

UNITED STATES PATENTS 2,582,294 1/1952 Stober....................................264/286
3,244,799 4/1966 Roberts...................................174/107

*Primary Examiner*—William A. Powell
*Assistant Examiner*—James J. Bell
*Attorney*—Spencer & Kaye

[57] ABSTRACT

Corrugated plates are made of polyvinyl chloride resin, and are bidirectionally oriented in such a manner that an element which is sampled therefrom presents a retraction of at least 30 percent along the two main axes of the plates after a residence of 8 hours in an oven kept at 140° C. The plates have a resiliency in tension at 20° C in excess of 650 cm kgf/cm² and a resiliency in prestressed condition in excess of 300 kfg/cm². They are resistant at 4° C to impacts caused by boxwood balls of 200 mm diameter which are projected perpendicularly against the surface of said plates at a speed such that their kinetic energy is 0.105 m kgf.

8 Claims, 1 Drawing Figure

Patented May 9, 1972
3,661,694
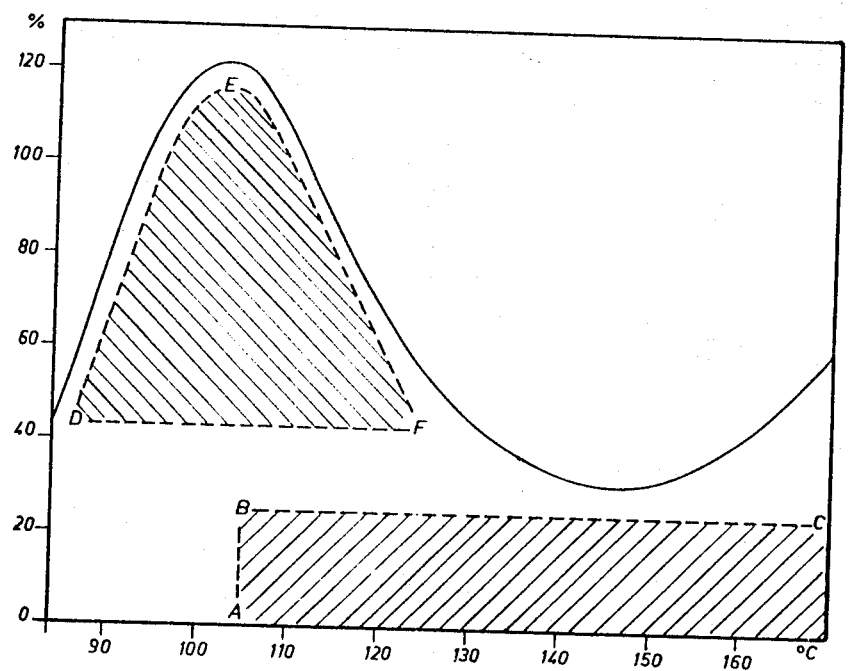
INVENTORS.
Jean François Bequet
Roger Van Asbroeck
Paul Dubois
BY *Spencer & Kaye*
ATTORNEYS.

BIDIRECTIONALLY ORIENTED CORRUGATED PLATES

RELATED APPLICATION

Applicants' copending application Ser. No. 102,606, filed Dec. 30, 1970, corresponding to Belgian Pat. No. 743,923, filed Dec. 31, 1969, in Belgium.

BACKGROUND OF THE INVENTION

Correguated plastic plates, for example those derived from polyvinyl chloride resins, have become very important in the field of civil construction.

When they are well made, these corrugated plates possess mechanical properties which enable them to resist transportation, handling and storing. In addition, under normal weather conditions, they have good resistance against atmospheric agents. However, their impact resistance especially after aging under bad weather, is generally insufficient to withstand unusual or heavy catastrophic hailstroms.

Attempts have been made to overcome this weakness by incorporating reinforcing agents in compositions used to produce these articles. However, this has proved to be costly and difficult.

Sheets and flat plates made of polyvinyl chloride resins have improved mechanical properties when they are biaxially stretched under conditions which induce some kind of orientation. However, it has not been possible heretofore to produce satisfactory corrugated articles from such sheets or plates which are bidirectionally oriented.

As a matter of fact, processes which are generally used to produce such sheets or plates from polyvinyl chloride resins comprise warming these articles to soften them and passing the softened articles between fixed shaping elements which are cooled with circulating water and which solidify the softened articles according to the shape determined by the geometry of the shaping members.

If, in this process, sheets or plates which have previously been bidirectionally oriented are used and kept stretched to counteract their high elasticity, the frictional forces between the shaping members tear the sheets or plates.

SUMMARY OF THE INVENTION

The present invention concerns corrugated articles which are bidirectionally oriented and are made of polyvinyl chloride resins. These articles present outstanding mechanical characteristics.

BRIEF DESCRIPTION OF THE DRAWING

The sole FIGURE is a plot of percent elongation at break versus temperature for polyvinyl chloride resin.

DESCRIPTION OF THE PREFERRED EMBODIMENTS

Corrugated articles which possess a very regular and constant profile are produced from sheets or plates which are bidirectionally oriented and are made of vinyl chloride resins.

The corrugated articles which are bidirectionally oriented according to the invention possess a resiliency in tension in excess of 650 cm kgf/cm$^2$ and a resiliency in prestress condition which is higher than 300 kg/cm$^2$ when measured at 20° C. In addition, these corrugated articles have shown a resistance at 40° C against impacts caused by boxwood balls of 200 mm diameter which are projected perpendicularly against the surface of these articles at such a speed that the impact energy is 0.105 m kgf. The corrugated bidirectionally oriented plates according to the invention are obtained (a) by subjecting flat plates to a bidirectional stretching of at least 30 percent and preferably comprised between 70 and 120 percent, said plates being first heated at a temperature of from 85° – 125° C, and preferably of from 90° – 120° C, (b) by corrugating the oriented plates obtained to the desired shape and (c) by cooling the corrugated plates, while retaining their shape, to a temperature lower than the glass (second-order) transition temperature of the resin. A particularly suitable corrugating device is described hereinafter.

Corrugated articles obtained from sheets or plates derived from vinyl chloride resins, which have not previously been bidirectionally oriented and produced by passing them in a softened state between fixed, cooled shaping members can also possess a certain degree of bidirectional orientation after corrugation since the shaping of these sheets or plates can produce some longitudinal stretching as a result of traction exerted on these articles in order to force passage thereof between shaping members. In addition, there is obtained a transversal stretching the maximum rate of which is fixed by the ratio between the width of a flat sheet and the developed width of corrugated sheet having the same width as the flat sheet. The maximum rate of transversal stretching is consequently fixed by the sinuosity factor of the corrugated article. This factor depends on the shape of the corrugated article and can vary between 1.1 and 1.3. As a result, the transversal stretching is too weak to give the corrugated article mechanical properties which are substantially improved and comparable to those of corrugated articles according to the present invention.

The low rate of stretching obtained for sheets and plates when corrugating according to the last-noted procedure is established by a heat shrinkage test. When corrugated sheets or plates obtained are heated in an oven at a temperature of 140° C for 8 hours, substantially less than 25 percent shrinkage occurs. On the other hand, when an article corrugated according to the invention is submitted to the same treatment, the shrinkage thereof is more than 30 percent along each of the two main axes even though the shrinkage of the same product is negligible under the natural action of the sun.

Furthermore, the effect of stretching obtained from passage between cooled shaping elements cannot be compared with that of stretching according to the invention which is carried out under specific temperature conditions. These conditions are not selected specifically for cooling and solidifying the product; they are chosen to produce an important molecular orientation.

These conditions appear more clearly in the drawing which illustrates the stretching curve (elasticity) as a function of temperature for a rigid polyvinyl chloride resin composition (SOLVIC 239 — trademark — sold by SOLVIC S.A.).

This curve is obtained by biaxially stretching several samples of polyvinyl chloride of 24 cm × 24 cm × 4 mm heated at different temperatures the stretching being accomplished at a rate of 100 cm/sec and by plotting for each temperature of the samples the elongation at which they break.

As shown in this figure, stretching during calibration is always carried out in the ABC zone in which the lower limit with respect to temperature is determined by the minimum temperature which the sheet or plate must possess in order to be shaped by known processes.

However, biaxial stretching exerted on the sheet or flat plate before corrugation can advantageously be carried out in the DEF zone, i.e. not only at higher rates, e.g. 70 to 120 percent but also at lower temperatures, further increasing the effects of stretching on mechanical properties of the sheets or plates so treated.

The bidirectional stretching of the flat plates is of at least 30 percent and preferably comprised between 70 and 120 percent.

This bidirectional stretching may be effected simultaneously along both axes but in general it is preferable, on industrial scale, to stretch the flat plates first along one axe and then along the other.

The advantages derived from the corrugated articles which are bidirectionally oriented according to the present invention are illustrated by the following examples which are given as illustration only with no intention of being restricted thereto. In the examples all parts and percentages are by weight unless otherwise specified.

EXAMPLE 1

A flat plate having a thickness of 4 mm is made of a composition comprising 100 percent polyvinyl chloride sold by SOLVIC S.A. under the trademark SOLVIC 239.

1 percent of lead stearate (containing 28 percent lead), 1.5 percent of a barium (7 percent) and cadmium (10 percent) salt of $C_{12}$ fatty acid, 2 percent of epoxidized soya oil containing 6 percent oxygen as oxirane, 1 percent of a copolymer of methyl methacrylate and ethyl acrylate in a ratio of 87 to 13.

The plate is heated to 105° C and is stretched 100 percent in each of two perpendicular directions. Longitudinal stretching is carried out by passing the plate on consecutive cylinders which rotate at increasingly high speeds and the transversal stretching is made by gripping the edges with pliers mounted on two rails which deviate from one another.

This stretched plate is then converted into a trapezoidally corrugated article by passing the same between movable shaping members made of two series of endless chains which support U-shaped shells in which the upper edges have notches into which endless metallic wires are disposed. These chains are mounted on two superposed corrugating trays and when the latter are brought near one another, they imbricate the shells which support one another in such a manner that the wires disposed in the notches are located exactly where the plate should be bent to obtain the desired corrugated article. In this manner, the progressive corrugation of the plate is made by the continuous metallic wires which are disposed and held in space at the locations where the plate is to be bent.

The corrugating process described above prevents any risk of tearing. Furthermore, it produces corrugated articles having a constant transversal profile and in which the edges are rectilinear and without any defects.

The corrugating apparatus is described in detail in applicants' copending application Ser. No. 102,606, filed Dec. 30, 1970, corresponding to Belgian Pat. No. 743,923 filed of even date herewith.

The corrugated sheet which is obtained has a thickness of 1 mm and a sinuosity factor of 1.27.

If a square portion having a side of 1 m is cut from this corrugated article and is placed for 8 hours in an oven which is kept at 140° C, it will be realized that the latter has a shrinkage of 50 percent both in the transversal and in the longitudinal direction and that the thickness increases from 1 mm to 4 mm.

Table 1, which follows, gives the mechanical properties measured at 20° C of corrugated articles which are bidirectionally oriented. By way of comparison the same properties are measured for a corrugated product having the same composition but which is made by passing a nonstretched sheet between the same fixed shaping members.

TABLE I

| Properties | Norm | Unit | Classical corrugated article | Bidirectionally corrugated article |
| --- | --- | --- | --- | --- |
| Resiliency in tension | DIN 53448 | Cm.-kgf./cm.² | 538 | 1,719 |
| Resiliency in prestressed condition | (¹) | Kgf./cm.² | 195 | 680 |

¹ The resiliency in prestressed condition was measured in accordance with the method described in the French magazine "Plastiques Modernes et Elastomeres 1968, Sept. p. 134" and protected by Belgian Patent No. 713,208, filed April 4th, 1968. The emerging height of the blade is 0.6 mm. and the impact energy is 15.5 cm.-kgf.

In order to determine the impact resistance, such as the resistance to hail, or the corrugated articles made according to the invention to provide a comparison with the resistance of classical corrugated articles, the following test is employed.

Corrugated plate samples measuring 35 cm × 35 cm are subjected to the impact of boxwood balls having a density of 0.97, i.e. close to that of natural hail, at a temperature of 4° C. These balls are projected perpendicularly against the surface of the samples at the same speed as the free fall speed of natural hail. In order to reproduce the energy and the impact conditions as close as possible to reality, the balls have the same diameter as hail.

Each of ten plates of a sample lot are subjected to the repeated impact of balls of the same diameter until the appearance of a tear. However, the test does not go beyond 25 impacts for each plate. The sum of the ten numbers of impacts before tear with respect to 250 and expressed in percent, defines the percentages of nonperforated plates under the conditions of the test.

The tests were made on corrugated articles which are prepared in accordance with Example 1. The corrugated articles have a trapezoidal shape known as "GRECA" profile, a pitch of 70 mm and a height of 18 mm. The test was also carried out with corrugated articles of the same shape and produced in accordance with Example 1, but by passing an unstretched sheet between fixed shaping members.

With small balls of a diameter of 20 mm projected at a speed such that the impact energy was 0.105 m·kgf, the percentage of unperforated plates is 100 percent for the corrugated articles bidirectionally oriented in accordance with the invention and only 77 percent for the classical corrugated articles. These tests definitely show an improvement of the corrugated articles with respect to impact resistance.

EXAMPLES 2 to 8

Bidirectionally oriented corrugated articles were made in accordance with the process described in Example 1 by utilizing the various compositions given in Table II.

TABLE II

| Components percent of resin | Example 2 | 3 | 4 | 5 | 6 | 7 | 8 |
| --- | --- | --- | --- | --- | --- | --- | --- |
| Solvic 229 (trademark) | 100 | | | | | | |
| Solvic 239 (trademark) | | 100 | | | | | |
| Solvic P 265/110 (trademark) | | | 100 | | | | |
| Vipla KLE (trademark) | | | | 100 | | | |
| Solvic 237 (trademark) | | | | | 100 | | |
| Lucovyl GB 1510 (trademark) | | | | | | 100 | |
| Solvic P 265/111 (trademark) | | | | | | | 100 |
| Liquid tin dibutylmercaptide mixed with 25% of epoxidized soya oil | 2 | | | | | | |
| Tin dibutyldilaurate | 1 | | | | | | |
| Cetyl palmitate | 0.5 | | | | | | |
| Stearine | 0.2 | | | | | | |
| Cetyl-stearyl alcohol 50-50 | 1 | | | | | | |
| Copolymer of methyl methacrylate and ethyl acrylate (proportions 87/13) | 1.5 | 1 | 1 | 1 | 1 | 1 | 1 |
| Lead stearate 28% lead | | 1.2 | 1 | 1 | 1 | 1 | 1 |
| Barium (15%)-cadmium (8%) laurate | | 1.5 | | | | | |
| Epoxidized soya oil containing 6% oxirane oxygen | 3 | 2 | 2 | 2 | 2 | 2 | 2 |
| Trihydroxystearate of glycerol | | 2 | 2 | 2 | 2 | 2 | 2 |
| PE 421 | 0.2 | | | | | | |
| Barium (7%) and cadmium (10%) salts of $C_{12}$ fatty acids | | | 1.5 | 1.5 | 1.5 | 1.5 | 1.5 |

SOLVIC 229, 239, P265/110, 237 and P265/111 are polyvinyl chloride obtained by suspension and are produced by the firm SOLVIC S.A.

VIPLA KLE is a polyvinyl chloride also obtained by suspension and sold by MONTECATINI-EDISON.

LUCOVYL GB 1510 is a polyvinyl chloride obtained by mass polymerization and sold by PECHINEY.

PE 421 is a crushed polyethylene which is sold by SOLVAY & Cie.

Although the resins illustrated in Examples 1 to 8 are polyvinyl chloride resins, the subject invention is applicable to copolymers of vinyl chloride with other polymerizable monomers, e.g. vinylidene chloride, ethylene, propylene, vinyl acetate, acrylonitrile, alkyl acrylates and methacrylates, alkyl maleates and fumarates, vinyl stearate, acrylic and methacrylic acids and mixtures of such homopolymer or copolymer with a different vinyl chloride resin or with a reinforcing agent.

Copolymers and mixtures preferably have a vinyl chloride content of at least 60 percent, but this figure is not critical and even a smaller percentage will prove satisfactory.

The vinyl chloride resins are prepared by any polymerization process, e.g. mass polymerization, solution polymerization, emulsion polymerization, dispersion polymerization or polymerization in gaseous phase.

Exemplary reinforcing agents with which vinyl chloride resin is mixed include, e.g.

ABS and MBS rubbers, copolymers of butadiene, polyisoprene, post chlorinated and post sulfochlorinated polyethylene and copolymers of ethylene with other olefins or with vinyl acetate, methyl methacrylate or methylacrylate.

Compositions employed for the corrugated articles are either entirely polymeric or comprise one or more compounding agents, such as stabilizers, lubricants, processing aids, fillers, pigments and up to 5 percent by weight of plasticizer. The compounding agents can be any of those conventionally employed, and the instant invention is not in the selection of any particular individual or combination of compounding agents or in the amount or proportion of compounding agent(s) employed.

Exemplary compounding agents include:

stabilizers, e.g. lead stearate, dibutyltin (against heat) benzophenone and benzotriazol derivatives (against UV rays)

lubricants, e.g. stearic acid, cetyl palmitate, glycerol monooleate processing aids, e.g. copolymers of methyl methacrylate with ethyl acrylate, copolymers of vinyl chloride with vinyl or alkyl ethers, copolymers of styrene with acrylonitrile fillers, e.g. calcium carbonate, kaolin, silicates pigments e.g. titanium dioxide, iron oxide, nickel titanate, phtalocyamines plasticizers, e.g. dioctyl phtallate, diisooctyl phtallates, dibutyl phtallate, tricresyl phosphate.

Preferred compositions include at least 60 percent by weight resin, but as much as 60 percent by weight of compounding agents can be employed e.g. when the resin is polyvinyl chloride homopolymer. The overall and preferred ranges in weight percent for the several common compounding agents are:

stabilizers — from 0 to 10 percent, preferably from 1 to 4 per cent;

lubricants — from 0 to 5 percent, preferably about 2 percent;

processing aids — from 0 to 15 percent, preferably 1 to 10 percent fillers — from 0 to 30 percent, preferably from 1 to 10 percent pigments — from 0 to 10 percent, preferably about 5 percent; and plasticizers — from 0 to 5 percent preferably about 2 percent.

Table III shows mechanical properties at 20° C, respectively measured on subject corrugated articles and classical corrugated articles obtained from the same compositions. The classical articles are formed by passing a nonstretched sheet between fixed shaping members. The testing methods used are identical to those of Example 1.

TABLE III

| Example | Type of corrugated article | Resiliency in tension cm kgf/cm² | Resiliency in prestressed condition kgf/cm² |
|---|---|---|---|
| | classical | 148 | 135 |
| 2 | bidirectionally oriented | 1010 | 590 |
| | classical | 457 | 175 |
| 3 | bidirectionally oriented | 1692 | 690 |
| | classical | 488 | 170 |
| 4 | bidirectionally oriented | 1826 | 650 |
| | classical | 452 | 170 |
| 5 | bidirectionally oriented | 1884 | 660 |
| | classical | 499 | 180 |
| 6 | bidirectionally oriented | 1567 | 720 |
| | classical | 544 | 190 |
| 7 | bidirectionally oriented | 1749 | 760 |
| | classical | 448 | 180 |
| 8 | bidirectionally oriented | 1629 | 680 |

On the basis of Examples 1 to 8, the resiliency in tension does not reach 650 cm kgf/cm² and the resiliency in prestressed condition is always lower than 300 kgf/cm² for classical corrugated articles whereas these two values are always above the noted respective limits for corrugated articles according to the invention.

It will be understood that the above description of the present invention is susceptible to various modifications, changes and adaptations and the same are intended to be comprehended within the meaning and range of equivalents of the appended claims.

We claim:

1. A corrugated bidirectionally oriented vinyl chloride resin plate having a resiliency in tension at 20° C in excess of 650 cm kgf/cm², a resiliency in prestressed condition higher than 300 kgf/cm² and an impact resistance at 4° C sufficient to resist perpendicular impact of 20 mm diameter balls having a kinetic energy of 0.105 m kgf.

2. A corrugated plate according to claim 1 having a shrinkage of at least 30 percent along each of its two main axes after a residence of 8 hours at 140° C.

3. A corrugated plate according to claim 1 wherein the vinyl chloride resin is polyvinyl chloride.

4. A corrugated plate according to claim 1 wherein the vinyl chloride resin is a copolymer of vinyl chloride.

5. A corrugated plate according to claim 1 wherein the vinyl chloride resin is an admixture of two vinyl chloride resins.

6. A corrugated plate according to claim 1 wherein the vinyl chloride resin is compounded with at least one compounding agent selected from the group consisting of stabilizer, lubricant, processing aid, filler, pigment and plasticizer.

7. A trapezoidally corrugated plate according to claim 1.

8. A process for increasing resistance in both tension and prestress condition and impact resistance at 4° C of a vinyl chloride resin corrugated plate which comprises bidirectionally stretching to an extent of at least 30 percent at a temperature of at least 85° C vinyl chloride resin sheet from which the corrugated plate is formed and cooling the corrugated plate to a temperature below the glass transition temperature of the resin.

* * * * *

UNITED STATES PATENT OFFICE
CERTIFICATE OF CORRECTION

Patent No. 3,661,694    Dated May 9th, 1972

Inventor(s) Jean Francois Bequet, Roger Van Asbroeck and Paul Dubois

It is certified that error appears in the above-identified patent and that said Letters Patent are hereby corrected as shown below:

In the heading of the patent, line 4, change "Paul Du Bois" to --Paul Dubois--; line 5, change "lAlleund" to --l'Alleud--. In the 7th line of the ABSTRACT, change "kfg/cm$^2$" to --kgf/cm$^2$--. In Column 3, Table I, in the "Unit" Column, change "Cm.·kgf./cm.$^2$" to --cm·kgf/cm$^2$--; same column, change "Kgf./cm.$^2$" to --kgf/cm$^2$--.

Signed and sealed this 27th day of February 1973.

(SEAL)
Attest:

EDWARD M. FLETCHER, JR.      ROBERT GOTTSCHALK
Attesting Officer            Commissioner of Patents